(12) United States Patent
Sloane et al.

(10) Patent No.: US 11,451,550 B2
(45) Date of Patent: Sep. 20, 2022

(54) SYSTEM FOR AUTOMATED ELECTRONIC DATA EXFILTRATION PATH IDENTIFICATION, PRIORITIZATION, AND REMEDIATION

(71) Applicant: Bank of America Corporation, Charlotte, NC (US)

(72) Inventors: Brandon Sloane, Santa Barbara, CA (US); Michael Thomas Malarkey, Waxhaw, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 400 days.

(21) Appl. No.: 16/856,316

(22) Filed: Apr. 23, 2020

(65) Prior Publication Data
US 2021/0336958 A1  Oct. 28, 2021

(51) Int. Cl.
*H04L 9/40* (2022.01)
*G06N 20/00* (2019.01)
*G06F 16/901* (2019.01)
*G06Q 50/26* (2012.01)

(52) U.S. Cl.
CPC .......... *H04L 63/10* (2013.01); *G06F 16/9024* (2019.01); *G06N 20/00* (2019.01); *H04L 63/1433* (2013.01); *H04L 63/1441* (2013.01); *H04L 63/18* (2013.01); *G06Q 50/265* (2013.01)

(58) Field of Classification Search
CPC ....... H04L 63/10; H04L 63/144; H04L 63/20; H04L 63/1443; H04L 63/18; G06F 16/9024
See application file for complete search history.

(56) References Cited

U.S. PATENT DOCUMENTS

| | | |
|---|---|---|
| 8,140,062 B1 | 3/2012 | Hildner et al. |
| 8,533,465 B2 | 9/2013 | Trostle |
| 8,631,244 B1 | 1/2014 | Potts et al. |
| 9,483,646 B2 | 11/2016 | Eren et al. |
| 9,680,855 B2 | 6/2017 | Schultz et al. |
| 10,009,364 B2 | 6/2018 | Dasgupta et al. |
| 10,019,390 B2 | 7/2018 | Chitlur |
| 10,091,222 B1 | 10/2018 | Langton et al. |
| 10,218,735 B2 | 2/2019 | Strom et al. |
| 10,230,760 B2 | 3/2019 | Thakar et al. |
| 10,326,778 B2 | 6/2019 | Gong et al. |
| 10,462,116 B1 | 10/2019 | Sharifi Mehr et al. |
| 10,467,414 B1 | 11/2019 | Kindlund et al. |
| 10,469,508 B2 | 11/2019 | Muddu et al. |

(Continued)

*Primary Examiner* — Ali S Abyaneh
(74) *Attorney, Agent, or Firm* — Moore & Van Allen PLLC; Seongun M. Hong (57) ABSTRACT

A system for identifying and remediating data exfiltration paths is provided. In particular, the system may generate a map of the network environment which identifies all of the possible pathways and the steps of such pathways through which sensitive data may be exfiltrated. The system may then evaluate the potential impact associated with each exfiltration pathway and generate a prioritization scheme which may sort the pathways by their potential impacts. Based on the prioritization scheme, the system may, via a machine learning engine, provide one or more remediation processes that may be executed to reduce the chance of data exfiltration through certain potentially high-impact pathways.

17 Claims, 2 Drawing Sheets

(56) References Cited

U.S. PATENT DOCUMENTS

| | | | |
|---|---|---|---|
| 10,521,584 B1* | 12/2019 | Sharifi Mehr | H04L 63/1433 |
| 2015/0295808 A1 | 10/2015 | O'Malley et al. | |
| 2016/0277360 A1 | 9/2016 | Dwyier et al. | |
| 2017/0163666 A1 | 6/2017 | Venkatramani et al. | |
| 2019/0036955 A1 | 1/2019 | Langton et al. | |
| 2019/0130100 A1 | 5/2019 | Dymshits et al. | |
| 2019/0288836 A1 | 9/2019 | Carlough et al. | |
| 2019/0349403 A1 | 11/2019 | Anderson et al. | |
| 2020/0177618 A1* | 6/2020 | Hassanzadeh | G06F 21/552 |
| 2021/0021629 A1* | 1/2021 | Dani | H04L 63/1433 |
| 2021/0105294 A1* | 4/2021 | Kruse | H04L 63/145 |
| 2021/0288995 A1* | 9/2021 | Attar | H04L 41/22 |

\* cited by examiner

```
┌─────────────────────────────────────────────────────────────┐
│   IDENTIFY ONE OR MORE SETS OF TARGET DATA FOR              │
│                    EXFILTRATION                             │
│                        201                                  │
└─────────────────────────────────────────────────────────────┘
                              │
                              ▼
┌─────────────────────────────────────────────────────────────┐
│  GENERATE A MAP OF EXFILTRATION PATHWAYS FOR EACH OF THE    │
│            ONE OR MORE SETS OF TARGET DATA                  │
│                        202                                  │
└─────────────────────────────────────────────────────────────┘
                              │
                              ▼
┌─────────────────────────────────────────────────────────────┐
│      IDENTIFY ONE OR MORE IMPLEMENTED DATA SECURITY         │
│   CONTROLS AND ONE OR MORE UNIMPLEMENTED DATA SECURITY      │
│     CONTROLS FOR EACH EXFILTRATION PATHWAY IN THE MAP OF    │
│                   EXFILTRATION PATHWAYS                     │
│                        203                                  │
└─────────────────────────────────────────────────────────────┘
                              │
                              ▼
┌─────────────────────────────────────────────────────────────┐
│   GENERATE A PRIORITIZATION SCHEME BASED ON THE MAP OF      │
│                   EXFILTRATION PATHWAYS                     │
│                        204                                  │
└─────────────────────────────────────────────────────────────┘
                              │
                              ▼
┌─────────────────────────────────────────────────────────────┐
│  DISPLAY TO A USER ONE OR MORE RECOMMENDATIONS BASED        │
│              ON THE PRIORITIZATION SCHEME                   │
│                        205                                  │
└─────────────────────────────────────────────────────────────┘
```

FIG. 2

SYSTEM FOR AUTOMATED ELECTRONIC DATA EXFILTRATION PATH IDENTIFICATION, PRIORITIZATION, AND REMEDIATION

FIELD OF THE INVENTION

The present disclosure embraces a system for data exfiltration path identification, prioritization, and remediation.

BACKGROUND

There is a need for a way to identify potential data exfiltration paths.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for identifying and remediating data exfiltration paths. In particular, the system may generate a map of the network environment which identifies all of the possible pathways and the steps of such pathways through which sensitive data may be exfiltrated. The system may then evaluate the potential impact associated with each exfiltration pathway and generate a prioritization scheme which may sort the pathways by their potential impacts. Based on the prioritization scheme, the system may, via a machine learning engine, provide one or more remediation processes that may be executed to reduce the chance of data exfiltration through certain potentially high-impact pathways.

Accordingly, embodiments of the present disclosure provide a system for identifying and remediating data exfiltration paths. The system may comprise a memory device with computer-readable program code stored thereon; a communication device; and a processing device operatively coupled to the memory device and the communication device. The processing device may be configured to execute the computer-readable program code to identify one or more sets of target data for exfiltration; generate a map of exfiltration pathways for each of the one or more sets of target data; identify one or more implemented data security controls and one or more unimplemented data security controls for each exfiltration pathway in the map of exfiltration pathways; generate a prioritization scheme based on the map of exfiltration pathways; and display to a user one or more recommendations based on the prioritization scheme.

In some embodiments, generating the prioritization scheme comprises generating an exfiltration score for each exfiltration pathway, wherein the exfiltration score is based on the one or more implemented data security controls, the one or more unimplemented data security controls, and an exfiltration frequency.

In some embodiments, displaying the one or more recommendations comprises determining that implementing the one or more unimplemented data security controls would increase the exfiltration score for an exfiltration pathway; and providing a recommendation to implement the one or more unimplemented data security controls.

In some embodiments, the map of exfiltration pathways is a graph database comprising one or more nodes representing structures through which the target data passes.

In some embodiments, the one or more nodes each represent a hardware device or computing system.

In some embodiments, the one or more nodes each represent an application.

In some embodiments, the one or more nodes each represent a logical layer.

Embodiments of the present disclosure also provide a computer program product for identifying and remediating data exfiltration paths. The computer program product may comprise at least one non-transitory computer readable medium having computer-readable program code portions embodied therein, the computer-readable program code portions comprising executable code portions for identifying one or more sets of target data for exfiltration; generating a map of exfiltration pathways for each of the one or more sets of target data; identifying one or more implemented data security controls and one or more unimplemented data security controls for each exfiltration pathway in the map of exfiltration pathways; generating a prioritization scheme based on the map of exfiltration pathways; and displaying to a user one or more recommendations based on the prioritization scheme.

In some embodiments, generating the prioritization scheme comprises generating an exfiltration score for each exfiltration pathway, wherein the exfiltration score is based on the one or more implemented data security controls, the one or more unimplemented data security controls, and an exfiltration frequency.

In some embodiments, displaying the one or more recommendations comprises determining that implementing the one or more unimplemented data security controls would increase the exfiltration score for an exfiltration pathway; and providing a recommendation to implement the one or more unimplemented data security controls.

In some embodiments, the map of exfiltration pathways is a graph database comprising one or more nodes representing structures through which the target data passes.

In some embodiments, the one or more nodes each represent a hardware device or computing system.

In some embodiments, the one or more nodes each represent an application.

Embodiments of the present disclosure also provide a computer-implemented method for identifying and remediating data exfiltration paths. The method may comprise identifying one or more sets of target data for exfiltration; generating a map of exfiltration pathways for each of the one or more sets of target data; identifying one or more implemented data security controls and one or more unimplemented data security controls for each exfiltration pathway in the map of exfiltration pathways; generating a prioritization scheme based on the map of exfiltration pathways; and displaying to a user one or more recommendations based on the prioritization scheme.

In some embodiments, generating the prioritization scheme comprises generating an exfiltration score for each exfiltration pathway, wherein the exfiltration score is based on the one or more implemented data security controls, the one or more unimplemented data security controls, and an exfiltration frequency.

In some embodiments, displaying the one or more recommendations comprises determining that implementing the one or more unimplemented data security controls would increase the exfiltration score for an exfiltration pathway; and providing a recommendation to implement the one or more unimplemented data security controls.

In some embodiments, the map of exfiltration pathways is a graph database comprising one or more nodes representing structures through which the target data passes.

In some embodiments, the one or more nodes each represent a hardware device or computing system.

In some embodiments, the one or more nodes each represent an application.

In some embodiments, the one or more nodes each represent a logical layer.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects and/or processes used to accomplish the entity's objectives. In this regard, "resource" may refer to applications, data files, computing systems and/or hardware, computing resources (e.g., processing power, memory space, or the like), computing functions, or the like.

"Exfiltration" as used herein may refer to the unauthorized transfer or extraction of data from a computing system. In this regard, "exfiltration path" or "exfiltration pathway" as used herein may refer to the paths, routes, steps, and/or methods through or by which the data is exfiltrated from the computing system and/or the network environment.

"Node" or "vertex" as used herein may refer to a functional data unit within a graph database, where the vertices may be connected to one another via "edges" or "lines" which establish certain defined relationships between vertices. In some embodiments, the vertices and/or the edges may be associated with one or more "properties" which further add descriptive information to the vertices and/or edges.

Potentially sensitive data (e.g., user credentials, personal information, cryptographic keys, contact information, or the like) may be stored on multiple different devices and/or computing systems within an entity's network. Accordingly, the entity may wish to implement data security controls to mitigate the possibility of exfiltration of such data (which may be referred to herein as "target data") from the devices or computing systems by unauthorized parties. In some scenarios, the exfiltration of data may be accomplished, rather than a direct file transfer between the host computing system and the unauthorized computing system, through indirect pathways which may arise from the flow of data within the entity's network. For example, the target data may be exfiltrated by being transferred from the hard drive of a target computing system (e.g., a database server) to a hard drive of a workstation operated by an administrator, then transferred to the unauthorized computing system via a network file transfer (e.g., via FTP, HTTP, e-mail, or the like).

Accordingly, the system may automatically generate a map of all possible pathways through which target data may be exfiltrated. In this regard, the system may first identify all of the target data within the network to be analyzed. The system may receive information regarding the target data from the users within the network and/or by automatically scanning devices, networks, and computing systems. The system may further scan the network to determine the topology of the network (the devices and/or computing systems through which the target data may be exfiltrated). Once the target data and devices in the network topology have been identified, the system may identify the exfiltration paths for the target data.

In some embodiments, the system may generate a graph database which may represent the map of exfiltration paths. In such embodiments, each device or computing system may be expressed as nodes, whereas exfiltration paths may be expressed as edges which connect multiple nodes together. In some embodiments, the edges may be bi-directional to represent that target data may move in either direction between the two nodes (e.g., target data may move from Device A to Computing System B, and conversely from Computing System B to Device A). In one embodiment, one or more nodes (e.g., devices or computing systems) may be identified through their properties as "perimeter" nodes, or nodes which may be connected (whether in an authorized or unauthorized manner) to devices or computing systems outside of the enterprise environment. Target data that passes from a perimeter node to an outside (e.g., unauthorized) computing system may be considered to have been exfiltrated. In some embodiments, the system may generate multiple maps (and/or graph databases) which may reflect the state of the network from various different perspectives. For instance, the system may generate a hardware-level map that may identify devices and/or computing systems as nodes, as described above. Alternatively or in addition, the system may generate maps at the logical and/or application-level (e.g., the applications are expressed as nodes).

Once all of the exfiltration paths have been identified, the system may then evaluate the probability and potential impact of target data being exfiltrated through the various pathways. In this regard, the system may aggregate information regarding the various nodes and/or pathways. For instance, the system may aggregate information about the types of mitigating controls that may be implemented (e.g., network monitoring, firewalls, user authentication/authorization requirements, or the like) as well as existing data controls with respect to the various nodes.

The system may then evaluate the potential impact of the exfiltration paths based on the above information. In particular, the system may determine the strengths/weaknesses of the controls existing along the identified exfiltration paths, the consequences of loss of a particular piece of target data (e.g., loss magnitude), probability of exfiltration through certain pathways, and the like. In some embodiments, the system may maintain a historical database containing information about past instances of data exfiltration. In this regard, the system may continuously track and log information such as the type of data that was exfiltrated, the pathways that were utilized by the unauthorized parties, the controls that existed at the time of exfiltration, the impact the exfiltration had on the systems in the network, and the like. In this way, the system may provide real-world, historical evaluations of exfiltration pathways in addition to theoretical pathways.

In some embodiments, the system may, via a machine learning engine, provide a ranking of exfiltration paths sorted by their potential impact as well as recommendations to remediate certain pathways with high potential impact. In this regard, the system may generate exfiltration scores for each exfiltration pathway, where higher exfiltration scores may represent higher potential for exfiltration along the identified pathway. For instance, if the system determines that a particular pathway is missing a data security control between certain nodes in the pathway (e.g., a lack of FTP monitoring between a database and workstation), the system may generate a recommendation to the user to implement the missing control between the identified nodes, where the recommendation may show the predicted degree to which implementing the control would reduce the exfiltration score of the pathway. The system may further continuously monitor outcomes of taking certain actions (e.g., implementing controls) on actual data exfiltration incidents to fine-tune its recommendation processes over time. For instance, if implementing a certain control within a certain pathway had a greater than expected effect in mitigating exfiltration, the system may adjust its recommendation decisioning to favor the implemented control. In this way, the system may provide an entity with an intelligent way of prioritizing resources with respect to identifying and remediating exfiltration pathways.

The system as described herein confers a number of technological advantages over conventional data control systems. In particular, the system may allow an entity to automatically generate multidimensional maps and prioritization schemes for exfiltration paths that may not be feasibly created or understood on a manual basis. Furthermore, the machine learning engine may provide a way to efficiently allocate resources to mitigating the possibility of unauthorized intrusion and/or data exfiltration of sensitive data from within the network environment.

Figure 1:
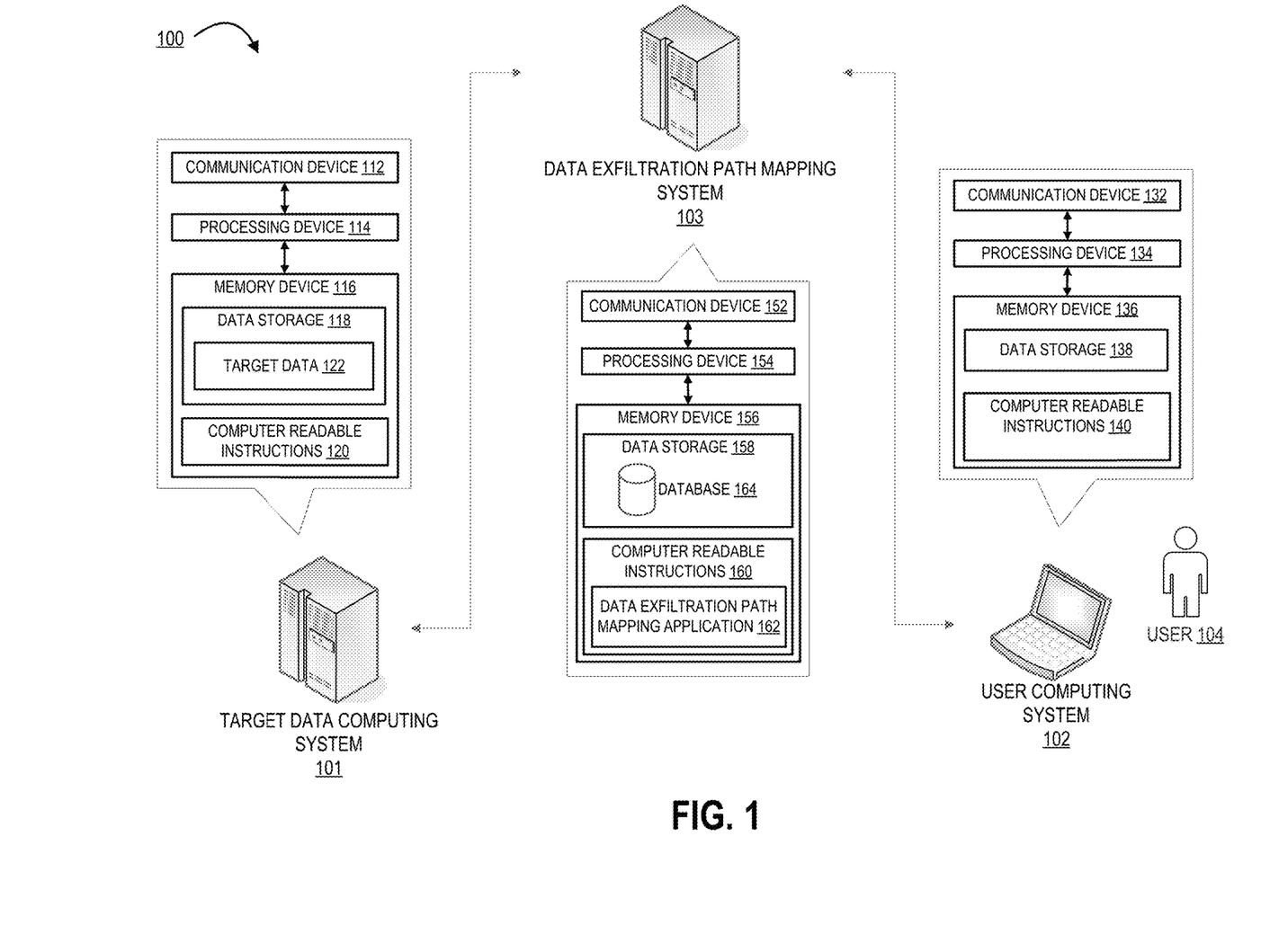
FIG. 1 illustrates an operating environment for the data exfiltration path mapping system, in accordance with one embodiment of the present disclosure.

Turning now to the figures, FIG. 1 illustrates an operating environment 100 for the data exfiltration path mapping system, in accordance with one embodiment of the present disclosure. In particular, FIG. 1 illustrates a data exfiltration path mapping system 103 that is operatively coupled, via a network, to a target data computing system 101 and a user computing system 102. In such a configuration, the data exfiltration path mapping system 103 may, in some embodiments, transmit information to and/or receive information from the target data computing system 101 and/or the user computing system 102. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the target data computing system 101 is depicted as a single unit, the operating environment 100 may comprise multiple target data computing systems 101 on which target data may be stored.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the data exfiltration path mapping system 103 may be a computing system that performs the data exfiltration path identification, prioritization, and remediation functions as described herein. Accordingly, the data exfiltration path mapping system 103 may comprise a communication device 152, a processing device 154, and a memory device 156. The data exfiltration path mapping system 103 may be a device such as a networked server, desktop computer, terminal, or any other type of computing system as described herein. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 154 is operatively coupled to the communication device 152 and the memory device 156. The processing device 154 uses the communication device 152 to communicate with the network and other devices on the network, such as, but not limited to the user computing system 102. The communication device 152 generally comprises a modem, antennae, WiFi or Ethernet adapter, radio transceiver, or other device for communicating with other devices on the network.

The memory device 156 may have computer-readable instructions 160 stored thereon, which in one embodiment includes the computer-readable instructions 160 of a data exfiltration path mapping application 162, which may comprise computer-executable program code which may instruct the processing device 154 to perform certain logic, data processing, and data storing functions of the application to accomplish the entity's objectives. For instance, the data exfiltration path mapping application 162 may generate exfiltration maps based on identifying potentially vulnerable data (e.g., target data) and exfiltration pathways. The system may further perform prioritization of exfiltration pathways based on their potential impact and provide recommendations for remediating weaknesses in certain high-impact pathways.

In some embodiments, the memory device 156 includes data storage 158 for storing data related to the system environment. In this regard, the data storage 158 may comprise a database 164, which may include various types of information regarding target data and/or exfiltration pathways. In some embodiments, the database 164 may comprise historical information regarding previous instances of data exfiltration. It should be understood that in alternative embodiments, the database 164 may be hosted on a separate computing system (e.g., a database server) instead of being hosted on the data exfiltration path mapping system 103.

As further illustrated in FIG. 1, the operating environment may further comprise a target data computing system 101 in operative communication with the data exfiltration path mapping system 103 and/or the user computing system 102. The target data computing system 101 may be any type of computing system which may contain data that is potentially a target for exfiltration by unauthorized parties. In this regard, the target data computing system may be a server, networked terminal, desktop, laptop, IoT device, smartphone, or the like. The target data computing system 101 may comprise a processing device 114 operatively coupled to a communication device 112 and a memory device 116 having data storage 118 and computer readable instructions 120 stored thereon.

The data storage 118 may comprise target data 122, which may be data that has been identified by the system as being potentially vulnerable to exfiltration. In this regard, the target data 122 may be identified and/or tracked by the data exfiltration path mapping system 103 (e.g., automatically by database queries or the like). For example, one possible exfiltration path may be a transfer of the target data 122 from the memory device 116 of the target data computing system 101 to the user computing system 102, then to an unauthorized computing system. The data exfiltration path mapping system 103 may identify such a path of the target data 122 and subsequently perform the prioritization and/or recommendation processes as described elsewhere herein.

As further illustrated in FIG. 1, the operating environment 100 may further comprise a user computing system 102 in operative communication with the data exfiltration path mapping system 103 and/or the target data computing system 101. The user computing system 102 may be a computing system that is operated by a user 104, such as an administrator, agent, or employee of the entity. In other embodiments, the user 104 may be a user which is external to the entity, such as a customer or client of the entity. Accordingly, the user computing system 102 may be a device such as a desktop computer, laptop, IoT device, smartphone, tablet, single-board computer, or the like. The user computing system 102 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The user computing system 102 may comprise a processing device 134 operatively coupled to a communication device 132 and a memory device 136 having data storage 138 and computer readable instructions 140 stored thereon. In some embodiments, the target data 122 of the target data computing system 101 may be transferred to the user computing system 102 as part of an exfiltration pathway. In other embodiments, the memory device 136 of the user computing system 102 itself may contain target data.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
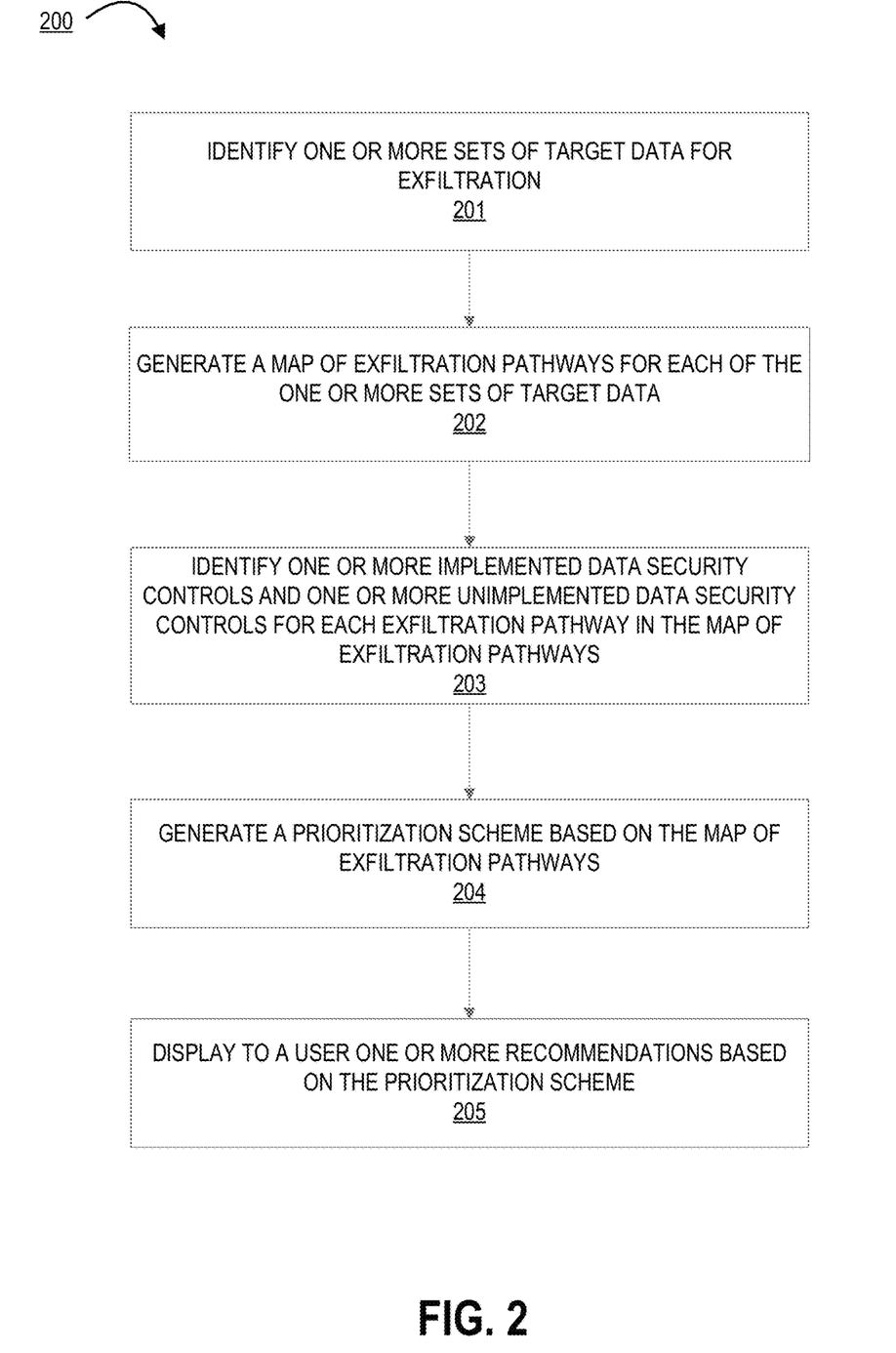
FIG. 2 illustrates a process flow for identifying and remediating exfiltration pathways, in accordance with some embodiments of the present disclosure.

FIG. 2 illustrates a process flow 200 for identifying and remediating exfiltration pathways, in accordance with one embodiment of the present disclosure. The process 200 begins at block 201, where the system identifies one or more sets of target data for exfiltration. The target data may comprise sensitive information that may be subject to exfiltration attempts by unauthorized parties. An entity's network may have various types of target data which may be stored across multiple different devices and/or computing systems. Accordingly, in some embodiments, the system may automatically track the location, type, and movement of the target data (e.g., by querying computing systems for certain types of data). For example, the system may submit database queries to the various database within the network environment to identify instances of target data along with their data type (e.g., personally identifiable information, organizational secrets, user credentials, or the like), storage location (e.g., a hard disk within a database server), number of copies, and the like. In some embodiments, users may further submit information regarding the existence of target data on certain other systems or devices. For instance, target data may be stored on a portable memory drive (e.g., flash memory drive) which may not be reachable by submitting database queries.

The process continues to block 202, where the system generates a map of exfiltration pathways for each of the one or more sets of target data. In some embodiments, the map may be represented by the system as a graph database in which nodes may represent the structures on which the target data may be stored or through which the target data may pass, and edges may represent the links and directions of the transfer of the target data. The nodes and/or edges may be associated with one or more properties, where the properties reference the target data that may be stored on or pass through the various nodes.

In some embodiments, the system may generate multiple maps of exfiltration pathways, each of which may represent the different perspectives through which data may be exfiltrated. For instance, the system may generate a map of data exfiltration from a hardware/device perspective (where nodes represent computing systems or devices), application perspective (where nodes represent applications which may involve storing, processing, and/or transferring the target data), logical perspective (where nodes represent the various logical layers through which target data may pass), or the like. In this way, the system may be able to represent the various pathways through which data may be exfiltrated.

The process continues to block 203, where the system identifies one or more implemented data security controls and one or more unimplemented data security controls for each exfiltration pathway in the map of exfiltration pathways. In this regard, the system may pull data from a data security database which may contain a catalogue of possible data security controls (e.g., network monitoring, user credential/permission requirements, encryption requirements, or the like) as well as which data security controls, if any, have been implemented with respect to a given device, computing system, application, or the like. Accordingly, the system may determine which data security controls have or have not been implemented with respect to every possible exfiltration pathway.

Based on the existing data security controls, the system may generate an exfiltration score for each exfiltration pathway, where the exfiltration score represents the relative ease of the data being exfiltrated along the pathway. In some embodiments, the existence of certain data security controls may decrease the exfiltration score, while the lack of data security controls may increase the exfiltration score for a given pathway. Furthermore, data security controls with a strong impact on exfiltration rates may decrease the exfiltration score by relatively higher amounts, whereas the lack of said controls may increase the exfiltration score by relatively higher amounts.

In some embodiments, exfiltration scores may further take into account the potential impact of the exfiltration of certain data, as certain types of target data may be more sensitive than others. For example, an administrator's user credentials may, if compromised, have the potential to cause a greater impact on the entity's system compared to standard user credentials, as the administrator's credentials may give an unauthorized user greater freedom to take actions that may have a large operational impact (e.g., deleting/copying sensitive data, creating users and/or user classes, or the like).

In other embodiments, the system may further take into account the frequency (expected or observed) at which target data is exfiltrated through certain pathways. Accordingly, in some embodiments, the system may comprise a historical database which may contain historical data regarding past instances of data exfiltration attempts and/or successes by unauthorized parties. The historical data may include the target data, the type of target data, the exfiltration pathways used, the number of times exfiltration was attempted and/or succeeded, and the like. Accordingly, pathways that have been targeted in the past may have relatively higher exfiltration scores.

The process continues to block 204, where the system generates a prioritization scheme based on the map of exfiltration pathways. In this regard, the prioritization scheme may be an ordered list of exfiltration pathways according to their exfiltration scores. In such embodiments, exfiltration pathways with higher exfiltration scores (e.g., pathways with fewer/less effective data security controls, high exfiltration rates, and/or greater potential impacts of exfiltration of certain target data) may appear at the top of the list. By generating the prioritization scheme in this way, the system may allow the entity to efficiently allocate resources to increasing the security of identified pathways with high potential impact, which in turn allows the entity to realize the greatest possible effect for the resources spent.

The process concludes at block 205, where the system displays to a user one or more recommendations based on the prioritization scheme. The recommendations may include, for instance, a recommendation provided to a user (e.g., an administrator or employee of the entity) to implement a certain type of data security control for a given exfiltration pathway (e.g., implement network monitoring between a database server and a workstation). In generating the recommendations, the system may, via a machine learning engine, identify the exfiltration pathways for which the greatest possible reduction in exfiltration rates can be realized. For instance, for a given pathway, the system may calculate differences between the current exfiltration score and a projected exfiltration score if certain data security controls are implemented. The projected exfiltration score may be based at least in part on historical data comparing exfiltration rates before implementation of a particular data security control and after implementation of the data security control. In this way, the system may determine which data security controls have the greatest impact on exfiltration rates, once implemented. Over time, the system may, through its recommendations, be able to continuously drive decisioning processes with respect to increasing security of certain pathways.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for identifying and remediating data exfiltration paths, the system comprising:
a memory with computer-readable program code stored thereon;
a communication device; and
a processing circuitry operatively coupled to the memory and the communication device, wherein the processing circuitry is configured to execute the computer-readable program code to:
identify one or more sets of target data for exfiltration;
generate a map of exfiltration pathways for each of the one or more sets of target data;
identify one or more implemented data security controls and one or more unimplemented data security controls for each exfiltration pathway in the map of exfiltration pathways;
generate a prioritization scheme based on the map of exfiltration pathways, wherein generating the prioritization scheme comprises generating an exfiltration score for each exfiltration pathway, wherein the exfiltration score is based on the one or more implemented data security controls, the one or more unimplemented data security controls, and an exfiltration frequency, wherein the exfiltration frequency comprises a number of times exfiltration was attempted and a number of times exfiltration succeeded; and
display to a user one or more recommendations based on the prioritization scheme.

2. The system according to claim 1, wherein displaying the one or more recommendations comprises:
determining that implementing the one or more unimplemented data security controls would increase the exfiltration score for an exfiltration pathway; and
providing a recommendation to implement the one or more unimplemented data security controls.

3. The system according to claim 1, wherein the map of exfiltration pathways is a graph database comprising one or more nodes representing structures through which the target data passes.

4. The system according to claim 3, wherein the one or more nodes each represent a hardware device or computing system.

5. The system according to claim 3, wherein the one or more nodes each represent an application.

6. The system according to claim 3, wherein the one or more nodes each represent a logical layer.

7. A computer program product for identifying and remediating data exfiltration paths, the computer program product comprising at least one non-transitory computer readable medium having computer-readable program code portions embodied therein, the computer-readable program code portions comprising executable code portions for:
identifying one or more sets of target data for exfiltration;
generating a map of exfiltration pathways for each of the one or more sets of target data;
identifying one or more implemented data security controls and one or more unimplemented data security controls for each exfiltration pathway in the map of exfiltration pathways;
generating a prioritization scheme based on the map of exfiltration pathways, wherein generating the prioritization scheme comprises generating an exfiltration score for each exfiltration pathway, wherein the exfiltration score is based on the one or more implemented data security controls, the one or more unimplemented data security controls, and an exfiltration frequency, wherein the exfiltration frequency comprises a number of times exfiltration was attempted and a number of times exfiltration succeeded; and
displaying to a user one or more recommendations based on the prioritization scheme.

8. The computer program product according to claim 7, wherein displaying the one or more recommendations comprises:
determining that implementing the one or more unimplemented data security controls would increase the exfiltration score for an exfiltration pathway; and
providing a recommendation to implement the one or more unimplemented data security controls.

9. The computer program product according to claim 7, wherein the map of exfiltration pathways is a graph database comprising one or more nodes representing structures through which the target data passes.

10. The computer program product according to claim 9, wherein the one or more nodes each represent a hardware device or computing system.

11. The computer program product according to claim 9, wherein the one or more nodes each represent an application.

12. A computer-implemented method for identifying and remediating data exfiltration paths, wherein the computer-implemented method comprises:
identifying one or more sets of target data for exfiltration;
generating a map of exfiltration pathways for each of the one or more sets of target data;
identifying one or more implemented data security controls and one or more unimplemented data security controls for each exfiltration pathway in the map of exfiltration pathways;
generating a prioritization scheme based on the map of exfiltration pathways, wherein generating the prioritization scheme comprises generating an exfiltration score for each exfiltration pathway, wherein the exfiltration score is based on the one or more implemented data security controls, the one or more unimplemented data security controls, and an exfiltration frequency, wherein the exfiltration frequency comprises a number of times exfiltration was attempted and a number of times exfiltration succeeded; and
displaying to a user one or more recommendations based on the prioritization scheme.

13. The computer-implemented method according to claim 12, wherein displaying the one or more recommendations comprises:
determining that implementing the one or more unimplemented data security controls would increase the exfiltration score for an exfiltration pathway; and
providing a recommendation to implement the one or more unimplemented data security controls.

14. The computer-implemented method according to claim 12, wherein the map of exfiltration pathways is a graph database comprising one or more nodes representing structures through which the target data passes.

15. The computer-implemented method according to claim 14, wherein the one or more nodes each represent a hardware device or computing system.

16. The computer-implemented method according to claim 14, wherein the one or more nodes each represent an application.

17. The computer-implemented method according to claim 14, wherein the one or more nodes each represent a logical layer.

\* \* \* \* \*